US008060532B2

(12) United States Patent
White et al.

(10) Patent No.: US 8,060,532 B2
(45) Date of Patent: Nov. 15, 2011

(54) DETERMINING SUITABILITY OF ENTITY TO PROVIDE PRODUCTS OR SERVICES BASED ON FACTORS OF ACQUISITION CONTEXT

(75) Inventors: Eric R. White, Austin, TX (US); Phillip Bookert, Georgetown, TX (US); Sheila Rosenberg, Austin, TX (US)

(73) Assignees: Board of Regents, The University of Texas System, Austin, TX (US); Performance Accountability, LLC, Austin, TX (US)

( * ) Notice: Subject to any disclaimer, the term of this patent is extended or adjusted under 35 U.S.C. 154(b) by 275 days.

(21) Appl. No.: 12/570,123

(22) Filed: Sep. 30, 2009

(65) Prior Publication Data
US 2010/0185660 A1 Jul. 22, 2010

Related U.S. Application Data

(60) Provisional application No. 61/145,067, filed on Jan. 15, 2009.

(51) Int. Cl.
*G06F 17/30* (2006.01)
(52) U.S. Cl. ......... 707/791; 707/802; 707/822; 707/828

(58) Field of Classification Search ........... 707/600–831
See application file for complete search history.

(56) References Cited

U.S. PATENT DOCUMENTS 5,526,257 A 6/1996 Lerner
7,970,858 B2 * 6/2011 Adelman et al. .............. 709/217

* cited by examiner

*Primary Examiner* — Isaac M Woo
(74) *Attorney, Agent, or Firm* — Robert A. Voight, Jr.; Winstead P.C.

(57) ABSTRACT

A method, system and computer program product for determining the suitability of an entity to provide products or services. Category and measurement data is received concerning the entity where each category is assigned a value based on the acquisition context. If the value assigned to a category exceeds a threshold, then the measurement data for that category is used in evaluating the entity. This measurement data is weighted according to the acquisition context. A binary value is generated for each weighted measurement value that exceeds a threshold. These binary values are summed and weighted according to the confidence that the source of the data is correct. Further, the past performance and reputation of the entity is used in applying a weight to the summed binary values to generate a suitability value. If the suitability value exceeds a threshold, then it is deemed suitable to conduct business with the entity.

21 Claims, 7 Drawing Sheets

DETERMINING SUITABILITY OF ENTITY TO PROVIDE PRODUCTS OR SERVICES BASED ON FACTORS OF ACQUISITION CONTEXT

CROSS-REFERENCE TO RELATED APPLICATIONS

This application is related to the following commonly owned co-pending U.S. patent application:

Provisional Application Ser. No. 61/145,067, "Determining Suitability of Entity to Provide Products or Services Based on Factors of Acquisition Context," filed Jan. 15, 2009, and claims the benefit of its earlier filing date under 35 U.S.C. §119(e).

TECHNICAL FIELD

The present invention relates to evaluating product or service providers, and more particularly to evaluating the suitability of an entity to provide products or services based on factors (e.g., past performance, trustworthiness of information concerning the entity, weighted importance of data concerning the entity) of the acquisition context.

BACKGROUND OF THE INVENTION

Governments (local or federal) as well as companies often attempt to evaluate potential vendors or suppliers in order to determine whether business should be conducted with these vendors or suppliers. Currently, vendors or suppliers are provided with a standard list of multiple-choice questions (e.g., answer "A" if you strongly agree; "B" if you agree; "C" if you disagree" and "D" if you strongly disagree") relating to their business practices, ability to provide the goods or services and so forth. Each answer may be assigned a value. The values associated with all the answers may be added and compared to a threshold value. If the summed values exceed the threshold value, then it may be deemed suitable to conduct business with the vendor. Otherwise, it may be deemed unsuitable to conduct business with the vendor.

However, evaluating vendors based on a limited set of questions that are subject to human interpretation and evaluation is limiting and leads to inaccurate assessments. There are many factors that may be used in evaluating a vendor, such as the product or service costs, scheduling, quality, environmental impact, ability to sustain common business practices and so forth that may not be incorporated in the current evaluation method. Further, by using these standard forms for all vendors in various contexts (e.g., one vendor may be providing trash pickup; whereas, another vendor may be supplying semiconductor chips), these forms do not effectively evaluate the vendor based on the acquisition context (i.e., the context surrounding the products or services provided by the entity).

Further, the current evaluation method relies upon human decision-makers which are inherently subjective and cannot fully incorporate multiple factors in accessing the "suitability" of a vendor. Additionally, when one attempts to evaluate tens of thousands of vendors using the current evaluation method, the task becomes unmanageable.

Therefore, there is a need in the art for evaluating the suitability of an entity to provide products or services without the reliance of human decision makers. Further, the suitability of an entity needs to be evaluated based on the acquisition context that includes all the relevant factors.

BRIEF SUMMARY OF THE INVENTION

In one embodiment of the present invention, a method for determining the suitability of an entity to provide products or services comprises receiving a name of the entity to be evaluated. The method further comprises determining a reputation value of the entity. Additionally, the method comprises receiving category data regarding the entity. Furthermore, the method comprises receiving measurement data associated with the category data. In addition, the method comprises identifying a value for each category in the category data for an acquisition context involving the entity. Further, the method comprises identifying a weight for each of the measurement data associated with a category with a value that exceeds a first threshold value. Furthermore, the method comprises comparing each weighted measurement data with a second threshold value. In addition, the method comprises generating a binary value for each weighted measurement data that exceeds the second threshold value. Additionally, the method comprises summing up binary values for all weighted measurement data that exceed the second threshold value. Furthermore, the method comprises applying an appropriate weight to the summed binary values based on confidence the source of the category data and the measurement data is correct. Further, the method comprises receiving an input on performance of the entity in connection with products or services provided by the entity. Additionally, the method comprises generating a feedback value based on the received input. In addition, the method comprises applying the feedback value and the reputation value to the weighted summed binary values. Further, the method comprises generating a suitability value based on applying the feedback value and the reputation value to the weighted summed binary values. Additionally, the method comprises comparing the suitability value to a third threshold value. Further, the method comprises determining if the entity is suitable to provide products or services based on the comparison of the suitability value to the third threshold value.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWING

A better understanding of the present invention can be obtained when the following detailed description is considered in conjunction with the following drawings, in which.

DETAILED DESCRIPTION OF THE INVENTION

The present invention comprises a method, system and computer program product for determining the suitability of an entity to provide products, components, raw materials or services. In one embodiment of the present invention, category and measurement data is received concerning the entity where each category is assigned a value based on the acquisition context. If the value assigned to a category exceeds a threshold value, then the measurement data for that category is used in evaluating the entity. This measurement data may be weighted according to the acquisition context and compared to a threshold value. A binary value may be generated for each weighted measurement value that exceeds the threshold value. These binary values may be summed and then weighted according to the confidence that the source of the category and measurement data is correct. Further, the past performance and reputation of the entity is used in applying a weight to the summed binary values to generate a suitability value which is compared to a threshold value. If the suitability value exceeds this threshold value, then it is deemed suitable to conduct business with the entity.

The principles of the present invention described herein evaluate the suitability of an entity to provide products or services without the reliance of human decision makers while considering the relevant factors based on the acquisition context. An embodiment of a system implementing these principles of the present invention is discussed below in connection with FIG. 1.

Figure 1:
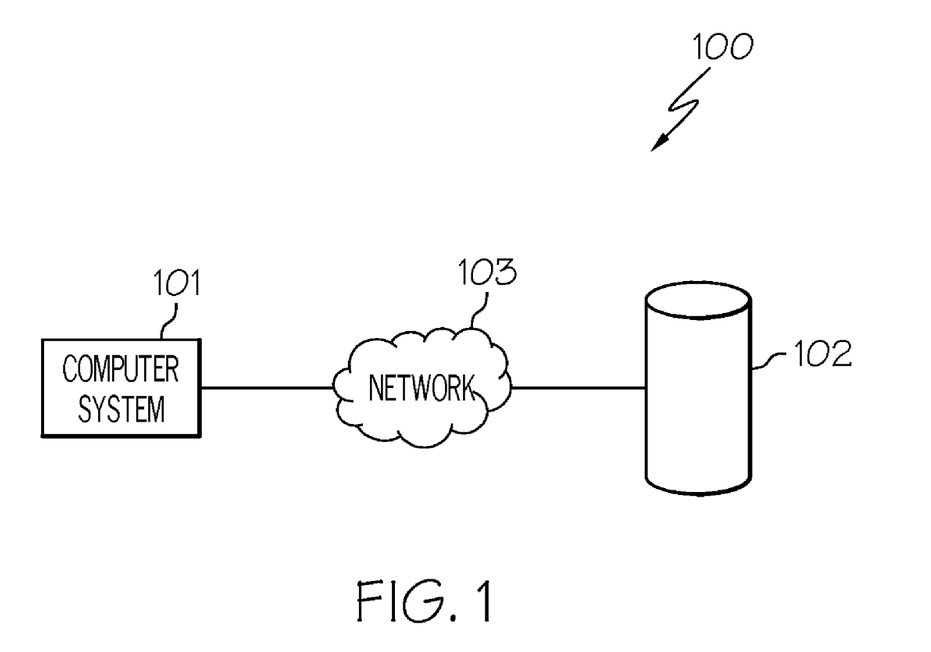
FIG. 1 illustrates an embodiment of the present invention of a system to practice the principles of the present invention.

FIG. 1 illustrates an embodiment of the present invention of a system 100 for practicing the principles of the present invention. Referring to FIG. 1, system 100 includes a computer system 101 coupled to a database 102 via a network 103. The connection between computer system 101 and database 102 via network 103 may be any medium type (e.g., wireless, wired). Further, network 103 may be a Local Area Network (LAN) (e.g., Ethernet, Token Ring, ARCnet) or a Wide Area Network (WAN) (e.g., Internet).

A more detail description of computer system 101 is provided below in connection with FIG. 2. While FIG. 1 illustrates a single database, it is noted that multiple databases may be accessed by computer system 101 to acquire various types of information (e.g., reputation value, value for category, weight for measurement data) as discussed further below.

Figure 2:
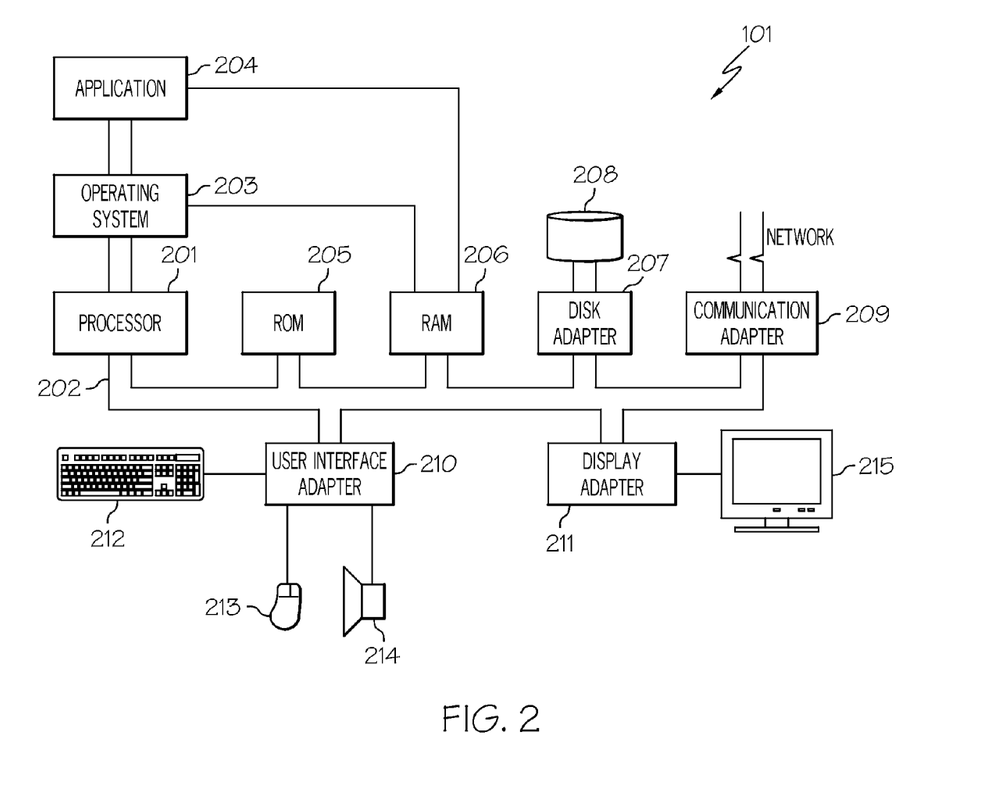
FIG. 2 illustrates the hardware configuration of a computer system in accordance with an embodiment of the present invention.

FIG. 2 illustrates an embodiment of a hardware configuration of computer system 101 which is representative of a hardware environment for practicing the present invention. Referring to FIG. 2, computer system 101 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, a program for determining the suitability of an entity to provide products or services as discussed further below in association with FIGS. 3A-D and 4.

Referring to FIG. 2, read-only memory ("ROM") 205 may be coupled to system bus 202 and include a basic input/output system ("BIOS") that controls certain basic functions of computer device 101. Random access memory ("RAM") 206 and disk adapter 207 may also be coupled to system bus 202. It should be noted that software components including operating system 203 and application 204 may be loaded into RAM 206, which may be computer system's 101 main memory for execution. Disk adapter 207 may be an integrated drive electronics ("IDE") adapter that communicates with a disk unit 208, e.g., disk drive. It is noted that the program for determining the suitability of an entity to provide products or services, as discussed further below in association with FIGS. 3A-D and 4, may reside in disk unit 208 or in application 204.

Referring to FIG. 2, computer system 101 may further include a communications adapter 209 coupled to bus 202. Communications adapter 209 may interconnect bus 202 with an outside network (not shown) thereby allowing computer system 101 to communicate with other similar devices.

I/O devices may also be connected to computer system 101 via a user interface adapter 210 and a display adapter 211. Keyboard 212, mouse 213 and speaker 214 may all be interconnected to bus 202 through user interface adapter 210. Data may be inputted to computer system 101 through any of these devices. A display monitor 215 may be connected to system bus 202 by display adapter 211. In this manner, a user is capable of inputting to computer system 101 through keyboard 212 or mouse 213 and receiving output from computer system 101 via display 215 or speaker 214.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" or FORTRAN programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As discussed in the Background section, evaluating vendors based on a limited set of questions that are subject to human interpretation and evaluation is limiting and leads to inaccurate assessments. There are many factors that may be used in evaluating a vendor, such as the product or service costs, scheduling, quality, environmental impact, ability to sustain common business practices and so forth that may not be incorporated in the current evaluation method. Further, by using these standard forms for all vendors in various contexts (e.g., one vendor may be providing trash pickup; whereas, another vendor may be supplying semiconductor chips), these forms do not effectively evaluate the vendor based on the acquisition context. Further, the current evaluation method relies upon human decision-makers which are inherently subjective and cannot fully incorporate multiple factors in accessing the "suitability" of a vendor. Additionally, when one attempts to evaluate tens of thousands of vendors using the current evaluation method, the task becomes unmanageable. Therefore, there is a need in the art for evaluating the suitability of an entity to provide products or services without the reliance of human decision makers. Further, the suitability of an entity needs to be evaluated based on the acquisition context that includes all the relevant factors.

A method for evaluating the suitability of an entity to provide products or services without the reliance of human decision makers while considering the relevant factors based on the acquisition context is discussed below in association with FIGS. 3A-D.

Referring to FIGS. 3A-D, FIGS. 3A-D are a flowchart of a method 300 for determining the suitability of an entity to provide products or services without the reliance of human decision makers while considering the relevant factors based on the acquisition context in accordance with an embodiment of the present invention.

Figure 3A:
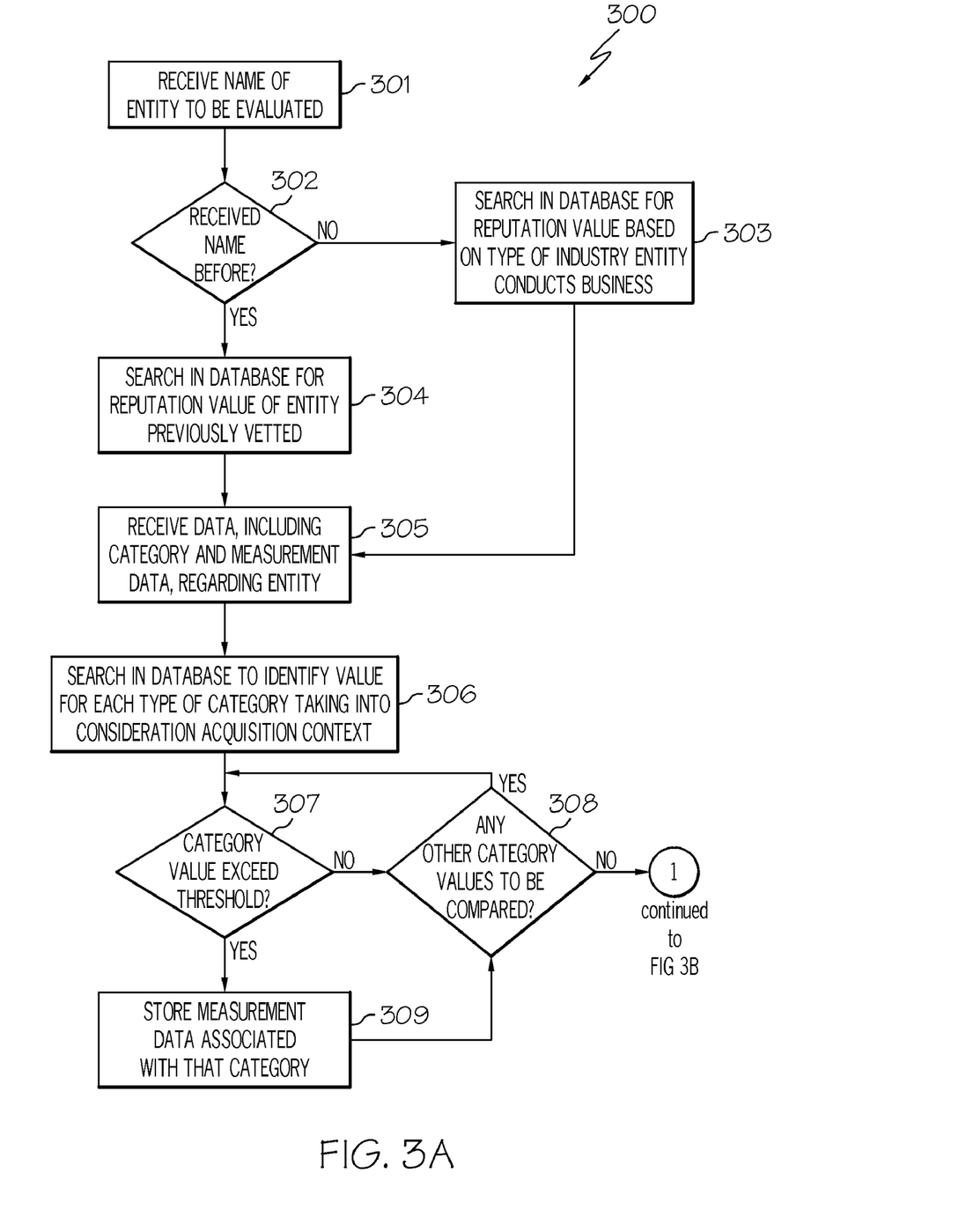
FIGS. 3A-D are a flowchart of a method for determining the suitability of an entity to provide products or services in accordance with an embodiment of the present invention.

Referring to FIG. 3A, in conjunction with FIGS. 1-2, in step 301, the name of the entity to be evaluated is received.

In step 302, it is determined whether the name of this entity has been previously received. If the name of the entity to be evaluated has not been previously received (i.e., the entity has not previously been evaluated), then, in step 303, a search is performed in a database (e.g., database 102) for a value, referred to herein as a "reputation value," associated with the type of industry (e.g., semiconductor, telecommunications, hazardous waste collection) the entity conducts business. In one embodiment, the reputation value may be a normalized value, such as a decimal fraction (e.g., 0.2), between the integers zero and one. In one embodiment, the reputation value corresponds to the reputation of the entity based on various factors, such as completing the job on time, performing a high quality job, etc. The higher the reputation value, the better the reputation of the entity. For entities that have not been previously vetted, the reputation value may be approximately based on the industry the entity conducts business. Some industries may be more regulated, and hence, may be believed to more reputable than other industries.

If, however, the entity has been previously vetted, then, in step 304, a search is performed in a database (e.g., database 102) for the reputation value for the entity previously vetted.

Upon obtaining the reputation value in either step 303 or step 304, data, including category and measurement data regarding the entity to be evaluated, is received in step 305. Category data, as referred to herein, may refer to multiple classifications (e.g., financial, safety, security, taxes) used to evaluate an entity. These classifications may be referred to herein as "categories." Each category in the category data may be associated with data, referred to herein as "measurement data." For instance, the financial category may include measurement data directed at the sales, profits, revenues, expenses, etc., of the entity.

Based on the acquisition context, some categories may be more important than others. "Acquisition context," as used herein, may refer to the conditions involving the products or services to be provided by the entity. For instance, if the entity to be evaluated is to be providing the service of dismantling nuclear weapons, then the "acquisition context" refers to the conditions involving the service of dismantling nuclear weapons. In this example, categories directed to safety and security may be more important, and hence weighted more highly, than other categories, such as community service activities.

In step 306, a search is performed in a database (e.g., database 102) for a value associated with each category in the category data taking into consideration the acquisition context. In one embodiment, the values for each category may be a decimal fraction (e.g., 0.2), normalized between the integers zero and one. As discussed above, some categories may be more important than others based on the acquisition context. As a result, those categories may be assigned a higher value than other categories.

In step 307, a determination is made as to whether the category value exceeds a threshold value. In one embodiment, the threshold value is established based on the particular acquisition context.

If the category value does not exceed the threshold value, then in step 308, a determination is made as to whether there are any other category values to be compared with the threshold value. If so, then a determination is made for the next category value as to whether it exceeds a threshold value in step 307.

If, however, the category value does exceed the threshold value, then, in step 309, the measurement data associated with that category is stored, such as in disk unit 208. Upon storing the measurement data associated with the category whose value exceeds the threshold value, a determination is made in step 308 as to whether there are any other category values to be compared with the threshold value.

Figure 3B:
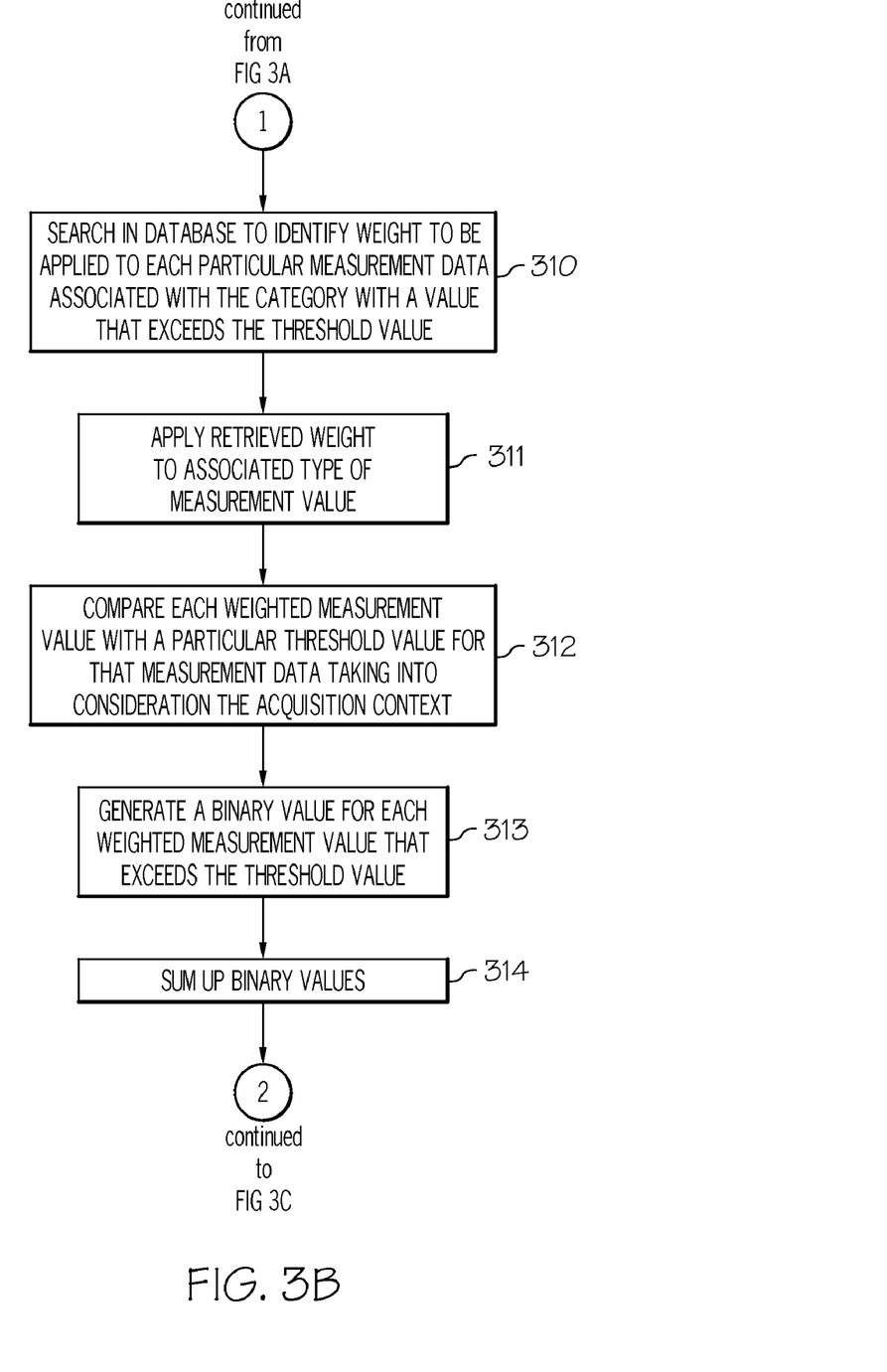

Referring to FIG. 3B, in conjunction with FIGS. 1-2, if, however, there are no more category values to be evaluated, then, in step 310, a search is performed in a database (e.g., database 102) to identify the weight (e.g., decimal fraction between the integers 0 and 1) to be applied to each particular measurement data associated with the category with a value that exceeds the threshold value discussed above (step 307).

In step 311, the retrieved weight is applied to the appropriate measurement data. For instance, suppose that the financial category was assigned a value that exceeded the threshold value. The measurement data (e.g., profits, revenue, expenses) associated with the financial category may each be assigned a weight based on its importance in connection with the acquisition context. For example, profits and revenue may be more highly weighted than expenses. Once the weight is retrieved, it is then applied to the appropriate measurement data. For instance, suppose that the entity generated $500,000 in profits. If the weight for profits is 0.5, then after applying the weight to the profits, the result would be $250,000.

In step 312, each weighted measurement value is compared with a particular threshold value for that measurement data. For instance, referring to the example above, the weighted measurement value for profits is $250,000. The value of $250,000 may be compared with a threshold value (e.g., $200,000) designated for profits taking into consideration the acquisition context.

In step 313, a binary value (e.g., binary value of one) is generated for each weighted measurement value that exceeds the threshold value designated for that measurement data taking into consideration the acquisition context.

In step 314, the binary values (e.g., binary values of one) are summed.

Figure 3C:
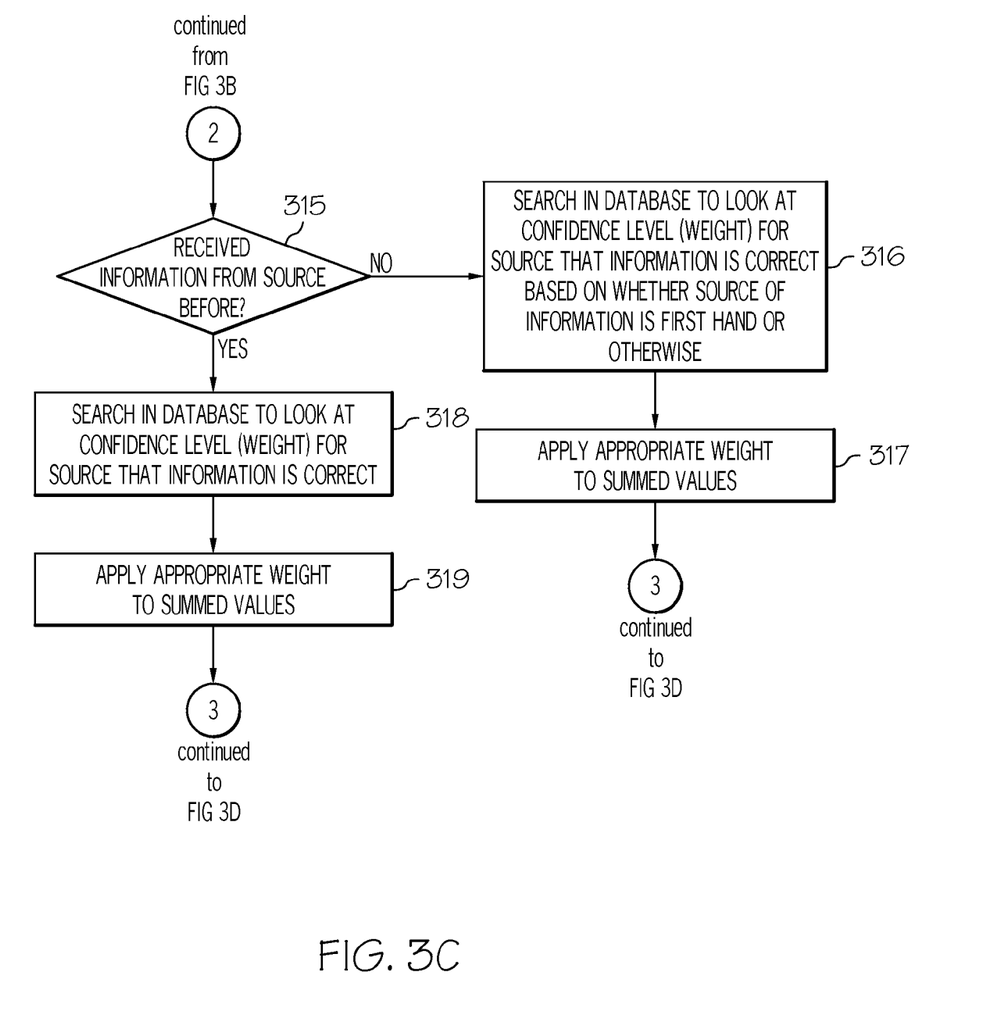

Referring to FIG. 3C, in conjunction with FIGS. 1-2, in step 315, a determination is made as to whether the source of the information (e.g., category and measurement data received in step 305) has previously provided information.

If the source of the information has not previously provided information, then, in step 316, a search is performed in a database (e.g., database 102) to obtain a value, referred to herein as the "confidence level," to be applied to the summed values computed in step 314. "Confidence level," as used herein, refers to a weighted value (e.g., decimal fraction between the integer values of 0 and 1) that corresponds to how trustworthy one believes that the source of the information is correct. In one embodiment, if the source of the information has not been previously vetted, then the confidence level or weight may be determined based on whether the information is provided first hand or otherwise. Information that is provided first hand may be thought to be more trustworthy than information that is provided hearsay, such as being the fifth person removed from the original source of the information.

In step 317, the confidence level or weight is applied to the summed values computed in step 314.

If, however, the source of the information has previously provided information, then, in step 318, a search is performed in a database (e.g., database 102) to obtain the "confidence level" or weight associated with that source. For instance, if the source has previously provided information, then that source can be vetted and a determination can be made as to how trustworthy the source has been in the past. How trustworthy the source has been in the past may be captured in a value, referred to herein as the "confidence level."

In step 319, the confidence level or weight is applied to the summed values computed in step 314.

Figure 3D:
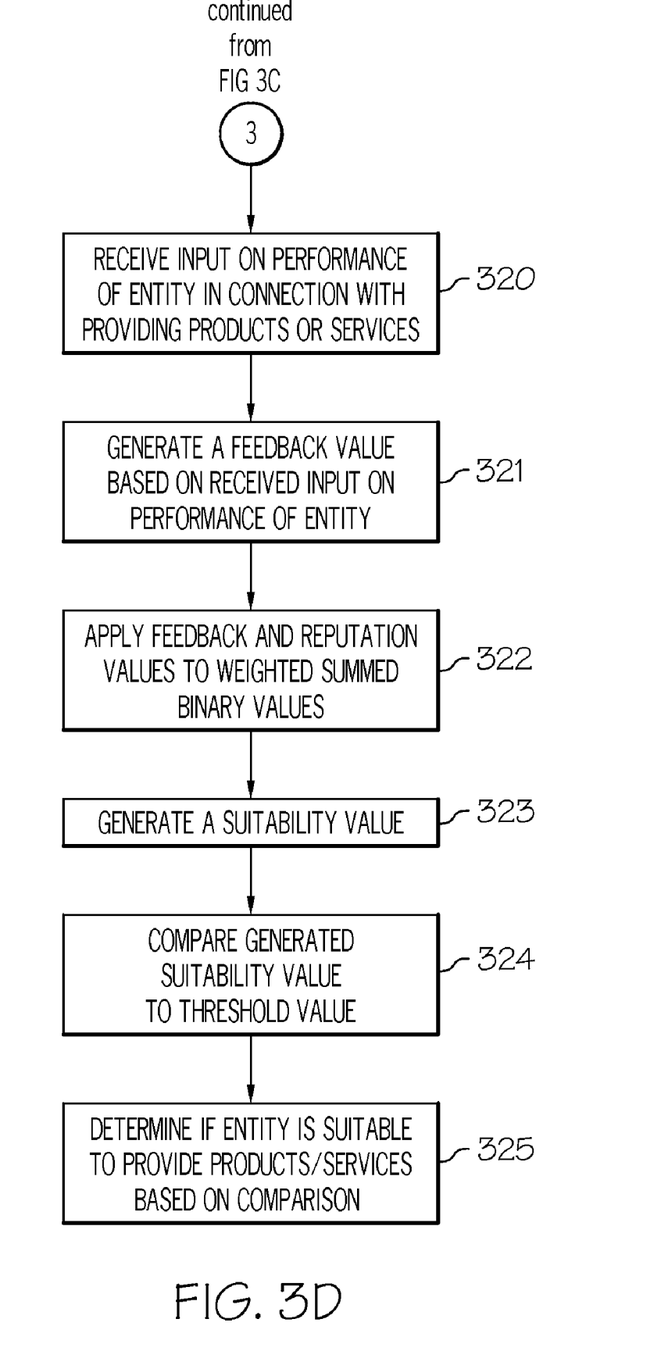

Referring to FIG. 3D, in conjunction with FIGS. 1-2, upon applying the confidence level to the summed values computed in step 314, in step 320, input is received regarding the performance of the entity in connection with the products or services provided by the entity. Various types of information may be received regarding the performance of the entity in connection with the products or services provided by the entity. Such information may be used to determine the quality of the products or services provided by the entity as well as to determine how well the entity performed. An example of such information is discussed below in connection with FIG. 4 which is a flowchart of the sub-steps of step 320 in accordance with an embodiment of the present invention.

Figure 4:
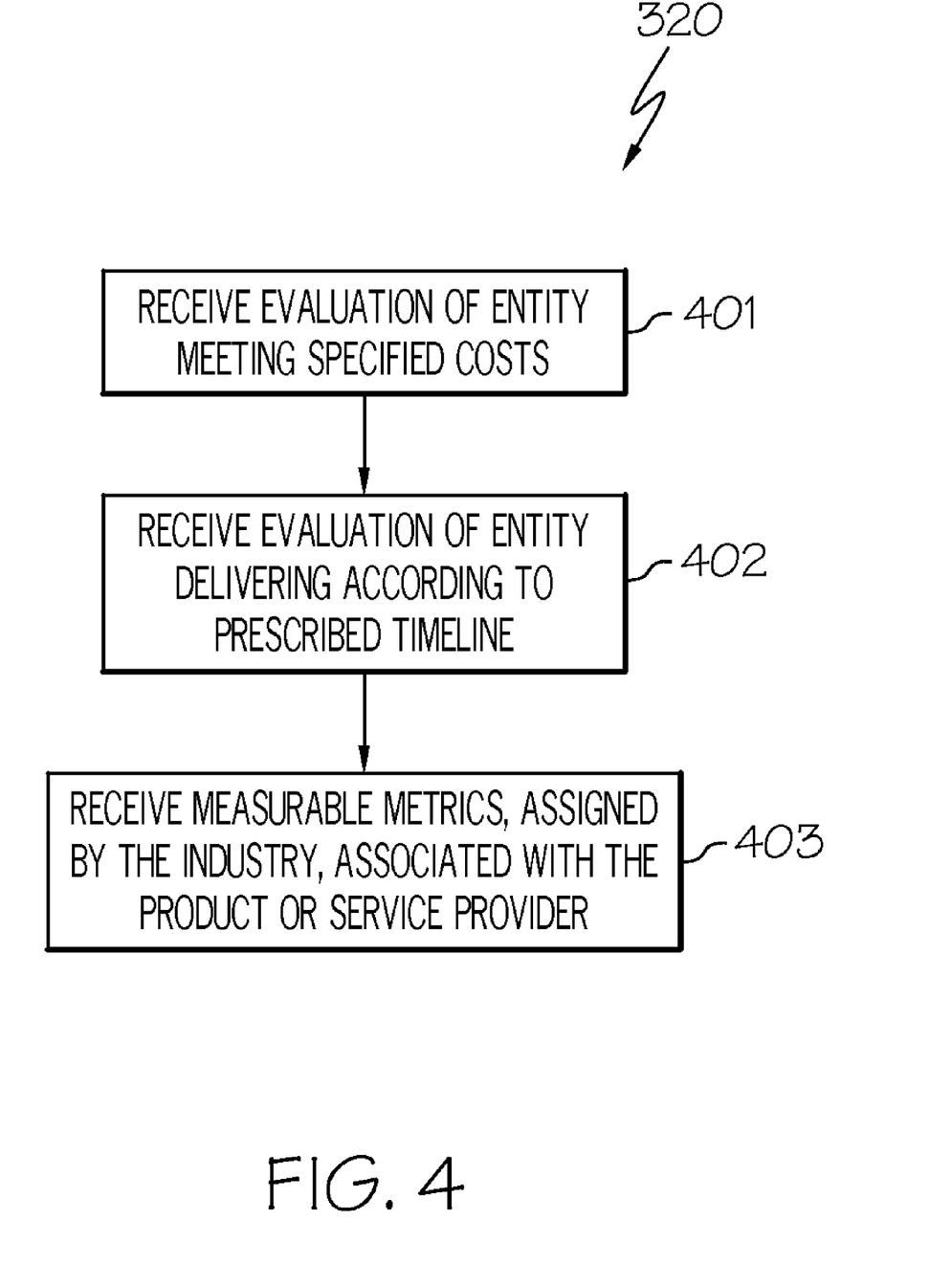
FIG. 4 is a flowchart of a method for the sub-steps of receiving input on the performance of the entity in connection with the products or services provided by the entity in accordance with an embodiment of the present invention.

Referring to FIG. 4, in conjunction with FIGS. 1-2, in step 401, an evaluation as to the entity meeting specified costs is received. In one embodiment, such an evaluation may be associated with a normalized value (e.g., decimal fraction) between the integers 0 and 1. For instance, if the entity consistently met specified costs, then the entity may receive a higher normalized value than if the entity consistently did not meet the specified costs.

In step 402, an evaluation as to the entity delivering according to the prescribed timeline is received. In one embodiment, such an evaluation may be associated with a normalized value (e.g., decimal fraction) between the integers 0 and 1. For instance, if the entity consistently completed the services or products on time, then the entity may receive a higher normalized value than if the entity was consistently tardy in completing the services or products.

In step 403, measureable metrics, assigned by the industry (the industry which the entity conducts business), is received. In one embodiment, the measureable metrics may be associated with a normalized value (e.g., decimal fraction) between the integers 0 and 1.

Returning to FIG. 3D, in conjunction with FIGS. 1-2, in step 321, a value, referred to herein as the "feedback value," is generated based on the received input regarding the performance of the entity in connection with the products or services provided by the entity. In one embodiment, the feedback value is a normalized value between the integers 0 and 1 that is based on the normalized values associated with the evaluations and measurable metrics received for the entity.

In step 322, the feedback value and the reputation value are applied to the weighted summed binary values (the weighted summed binary values of either step 317 or step 319).

In step 323, a value, referred to herein as the "suitability value," is generated based on the computation of step 322. In one embodiment, the suitability value is a normalized value between the integers 0 and 1.

In step 324, the suitability value is compared to a threshold value to determine whether it is suitable to conduct business with the entity. In one embodiment, this threshold value is determined based on the acquisition context.

In step 325, the suitability of the entity providing the products or services is determined based on the comparison of step 324. For instance, if the suitability value exceeds the threshold value, then the entity is deemed to be suitable to conduct business. Otherwise, the entity is not deemed to be suitable to conduct business.

Method 300 may include other and/or additional steps that, for clarity, are not depicted. Further, method 300 may be executed in a different order presented and that the order presented in the discussion of FIGS. 3A-D and 4 is illustrative. Additionally, certain steps in method 300 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for determining the suitability of an entity to provide products or services, the method comprising:
   receiving a name of said entity to be evaluated;
   determining a reputation value of said entity;
   receiving category data regarding said entity;
   receiving measurement data associated with said category data;
   identifying a value for each category in said category data for an acquisition context involving said entity;
   identifying a weight for each of said measurement data associated with a category with a value that exceeds a first threshold value;
   comparing each weighted measurement data with a second threshold value;
   generating a binary value for each weighted measurement data that exceeds said second threshold value;
   summing up binary values for all weighted measurement data that exceed said second threshold value;
   applying an appropriate weight to said summed binary values based on confidence source of said category data and said measurement data is correct;
   receiving an input on performance of said entity in connection with products or services provided by said entity;
   generating a feedback value based on said received input;
   applying said feedback value and said reputation value to said weighted summed binary values;
   generating a suitability value based on said applying of said feedback value and said reputation value to said weighted summed binary values;
   comparing said suitability value to a third threshold value; and
   determining if said entity is suitable to provide products or services based on said comparison of said suitability value to said third threshold value.

2. The method as recited in claim 1 further comprising:
   performing a search in a database for said reputation value associated with a type of industry of said entity if said name of said entity has not been previously received.

3. The method as recited in claim 1 further comprising:
   performing a search in a database for said reputation value associated with said entity if said name of said entity has been previously received.

4. The method as recited in claim 1 further comprising:
   generating a binary value of one for each weighted measurement data that exceeds said second threshold value; and
   summing up binary values of one for all weighted measurement data that exceeds said second threshold value.

5. The method as recited in claim 1 further comprising:
   applying said appropriate weight to said summed binary values based on whether said source of said category data and said measurement data is received first hand.

6. The method as recited in claim 1 further comprising:
   performing a search in a database to obtain said appropriate weight to be applied to said summed binary values if said source of said category data and said measurement data previously provided information.

7. The method as recited in claim 1, wherein said receiving said input on performance of said entity in connection with products or services provided by said entity comprises:
   receiving a first evaluation of said entity meeting specified costs;
   receiving a second evaluation of said entity according to a prescribed timeline; and
   receiving measurable metrics assigned by an industry of said entity.

8. A computer program product embodied in a computer readable medium for determining the suitability of an entity to provide products or services, the computer program product comprising the programming instructions for:
   receiving a name of said entity to be evaluated;
   determining a reputation value of said entity;
   receiving category data regarding said entity;
   receiving measurement data associated with said category data;
   identifying a value for each category in said category data for an acquisition context involving said entity;
   identifying a weight for each of said measurement data associated with a category with a value that exceeds a first threshold value;
   comparing each weighted measurement data with a second threshold value;
   generating a binary value for each weighted measurement data that exceeds said second threshold value;
   summing up binary values for all weighted measurement data that exceed said second threshold value;
   applying an appropriate weight to said summed binary values based on confidence source of said category data and said measurement data is correct;
   receiving an input on performance of said entity in connection with products or services provided by said entity;
   generating a feedback value based on said received input;
   applying said feedback value and said reputation value to said weighted summed binary values;
   generating a suitability value based on said applying of said feedback value and said reputation value to said weighted summed binary values;
   comparing said suitability value to a third threshold value; and
   determining if said entity is suitable to provide products or services based on said comparison of said suitability value to said third threshold value.

9. The computer program product as recited in claim 8 further comprising the programming instructions for:
   performing a search in a database for said reputation value associated with a type of industry of said entity if said name of said entity has not been previously received.

10. The computer program product as recited in claim 8 further comprising the programming instructions for:

performing a search in a database for said reputation value associated with said entity if said name of said entity has been previously received.

11. The computer program product as recited in claim 8 further comprising the programming instructions for:
generating a binary value of one for each weighted measurement data that exceeds said second threshold value; and
summing up binary values of one for all weighted measurement data that exceeds said second threshold value.

12. The computer program product as recited in claim 8 further comprising the programming instructions for:
applying said appropriate weight to said summed binary values based on whether said source of said category data and said measurement data is received first hand.

13. The computer program product as recited in claim 8 further comprising the programming instructions for:
performing a search in a database to obtain said appropriate weight to be applied to said summed binary values if said source of said category data and said measurement data previously provided information.

14. The computer program product as recited in claim 8, wherein said receiving said input on performance of said entity in connection with products or services provided by said entity comprises the programming instructions for:
receiving a first evaluation of said entity meeting specified costs;
receiving a second evaluation of said entity according to a prescribed timeline; and
receiving measurable metrics assigned by an industry of said entity.

15. A system, comprising:
a memory unit for storing a computer program for determining the suitability of an entity to provide products or services; and
a processor coupled to said memory unit, wherein said processor, responsive to said computer program, comprises:
circuitry for receiving a name of said entity to be evaluated;
circuitry for determining a reputation value of said entity;
circuitry for receiving category data regarding said entity;
circuitry for receiving measurement data associated with said category data;
circuitry for identifying a value for each category in said category data for an acquisition context involving said entity;
circuitry for identifying a weight for each of said measurement data associated with a category with a value that exceeds a first threshold value;
circuitry for comparing each weighted measurement data with a second threshold value;
circuitry for generating a binary value for each weighted measurement data that exceeds said second threshold value;
circuitry for summing up binary values for all weighted measurement data that exceed said second threshold value;
circuitry for applying an appropriate weight to said summed binary values based on confidence source of said category data and said measurement data is correct;
circuitry for receiving an input on performance of said entity in connection with products or services provided by said entity;
circuitry for generating a feedback value based on said received input;
circuitry for applying said feedback value and said reputation value to said weighted summed binary values;
circuitry for generating a suitability value based on said applying of said feedback value and said reputation value to said weighted summed binary values;
circuitry for comparing said suitability value to a third threshold value; and
circuitry for determining if said entity is suitable to provide products or services based on said comparison of said suitability value to said third threshold value.

16. The system as recited in claim 15, wherein said processor further comprises:
circuitry for performing a search in a database for said reputation value associated with a type of industry of said entity if said name of said entity has not been previously received.

17. The system as recited in claim 15, wherein said processor further comprises:
circuitry for performing a search in a database for said reputation value associated with said entity if said name of said entity has been previously received.

18. The system as recited in claim 15, wherein said processor further comprises:
circuitry for generating a binary value of one for each weighted measurement data that exceeds said second threshold value; and
circuitry for summing up binary values of one for all weighted measurement data that exceeds said second threshold value.

19. The system as recited in claim 15, wherein said processor further comprises:
circuitry for applying said appropriate weight to said summed binary values based on whether said source of said category data and said measurement data is received first hand.

20. The system as recited in claim 15, wherein said processor further comprises:
circuitry for performing a search in a database to obtain said appropriate weight to be applied to said summed binary values if said source of said category data and said measurement data previously provided information.

21. The system as recited in claim 15, wherein said circuitry for receiving said input on performance of said entity in connection with products or services provided by said entity comprises:
circuitry for receiving a first evaluation of said entity meeting specified costs;
circuitry for receiving a second evaluation of said entity according to a prescribed timeline; and
circuitry for receiving measurable metrics assigned by an industry of said entity.

* * * * *